(12) United States Patent
Dusanapudi et al.

(10) Patent No.: US 10,318,456 B2
(45) Date of Patent: Jun. 11, 2019

(54) VALIDATION OF CORRECTNESS OF INTERRUPT TRIGGERS AND DELIVERY

(71) Applicant: International Business Machines Corporation, Armonk, NY (US)

(72) Inventors: Manoj Dusanapudi, Bangalore (IN); Shakti Kapoor, Austin, TX (US); Brenton Yiu, Austin, TX (US); Siva Sundar A, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/804,102

(22) Filed: Nov. 6, 2017

(65) Prior Publication Data
US 2019/0138472 A1  May 9, 2019

(51) Int. Cl.
*G06F 13/00* (2006.01)
*G06F 13/26* (2006.01)
*G06F 9/48* (2006.01)

(52) U.S. Cl.
CPC .......... *G06F 13/26* (2013.01); *G06F 9/4881* (2013.01); *G06F 9/4806* (2013.01)

(58) Field of Classification Search
CPC .............................. G06F 13/26; G06F 9/4806
See application file for complete search history.

(56) References Cited

U.S. PATENT DOCUMENTS

| 5,513,346 | A | 4/1996 | Satagopan et al. |
| 5,555,420 | A * | 9/1996 | Sarangdhar ............. G06F 13/26 710/266 |
| 5,894,583 | A | 4/1999 | Johnson et al. |
| 7,464,211 | B2 | 12/2008 | Shah |
| 9,335,183 | B2 | 5/2016 | Hess et al. |
| 2016/0147679 | A1* | 5/2016 | Guddeti ................. G06F 13/24 710/269 |

OTHER PUBLICATIONS

Disclosed Anonymously; "Shared Interrupt Target Groups in a Simulated-Processor System", <http://ip.com/IPCOM/000250014>, IP.com No. IPCOM000250014D, May 16, 2017, 4 pages.
IBM; "Method for precise interrupt notification", <http://ip.com/IPCOM/000180459>, IP.com No. IPCOM000180459D, Mar. 10, 2009, 6 pages.
Tu, et al., "A Comprehensive Implementation and Evaluation of Direct Interrupt Delivery", VEE '15, ACM, Mar. 14-15, 2015, Istanbul, Turkey, 15 pages.

* cited by examiner

*Primary Examiner* — Zachary K Huson
(74) *Attorney, Agent, or Firm* — Christopher K. McLane; Alexander G. Jochym

(57) ABSTRACT

In an approach to validation of correctness of interrupt triggers and delivery a computer allocates one or more flags of a gang of flags. The computer allocates one or more interrupt source numbers, wherein each interrupt source number of the one or more interrupt source numbers corresponds to a flag of the gang of flags. The computer allocates one or more virtual processors to process the one or more interrupt source numbers. The computer schedules the one or more virtual processors. The computer receives one or more interrupt triggers corresponding to the one or more interrupt source numbers. The computer updates the one or more flags corresponding to the one or more received interrupt triggers. The computer determines whether all of the one or more flags in the gang of flags is updated. The computer determines a lost interrupt source number.

20 Claims, 6 Drawing Sheets

VALIDATION OF CORRECTNESS OF INTERRUPT TRIGGERS AND DELIVERY

BACKGROUND OF THE INVENTION

The present invention relates generally to the field of interrupt processing, and more particularly to validation of correctness of interrupt triggers and delivery.

Historically, a computer system or processor had only a single processor (aka processing unit or central processing unit). The processor included an instruction processing unit (IPU), a branch unit, a memory control unit and the like. Processors were later developed that incorporated multiple IPUs. Such processors were often referred to as multi-processors. Each such processor of a multi-processor computer system may include individual or shared caches, memory interfaces, system bus, address translation mechanism and the like. Virtual machine and instruction set architecture (ISA) emulators added a layer of software to a processor, that provided the virtual machine with multiple "virtual processors" by time-slice usage of a single IPU in a single hardware processor. As technology further evolved, multi-threaded processors were developed, enabling a single hardware processor having a single multi-thread IPU to provide a capability of simultaneously executing threads of different programs. Thus, each thread of a multi-threaded processor appeared to the operating system as a processor. As technology further evolved, it was possible to put multiple processors (each having an IPU) on a single semiconductor chip or die. These processors were referred to as processor cores or cores. Thus, terms such as processor, central processing unit, processing unit, microprocessor, core, processor core, processor thread, and thread, for example, are often used interchangeably.

The processor architecture of a computer system typically supports several types of interrupts. An interrupt is a notification given to the processor that causes the processor to halt the execution of code, such as operating code, and handle a condition that has arisen in the system or in one of the external devices of the system. As an example, when a key is pressed on the keyboard, an interrupt is passed to the processor from a peripheral controller. The interrupt causes the processor to momentarily stop its current execution stream and receive data from the peripheral controller. The interrupt causes overhead in the server processing unit due to the necessary context switch and latencies for bringing necessary interrupt code into a cache. Only then the processing unit can start actually processing the interrupt. The interrupt cause can be stored in one or more linked lists in memory in order to provide the processing unit with information on the interrupt cause.

SUMMARY

Embodiments of the present invention disclose a method, a computer program product, and a system for validation of correctness of interrupt triggers and delivery. The method may include a computer allocates one or more flags of a gang of flags. The computer allocates one or more interrupt source numbers, wherein each interrupt source number of the one or more interrupt source numbers corresponds to a flag of the gang of flags. The computer allocates one or more virtual processors to process the one or more interrupt source numbers. The computer schedules the one or more virtual processors. The computer receives one or more interrupt triggers corresponding to the one or more interrupt source numbers. The computer updates the one or more flags corresponding to the one or more received interrupt triggers. The computer determines whether all of the one or more flags in the gang of flags is updated. In response to determining at least one of the one or more flags in the gang of flags is not updated, the computer determines a lost interrupt source number.

DETAILED DESCRIPTION

Figure 1A:
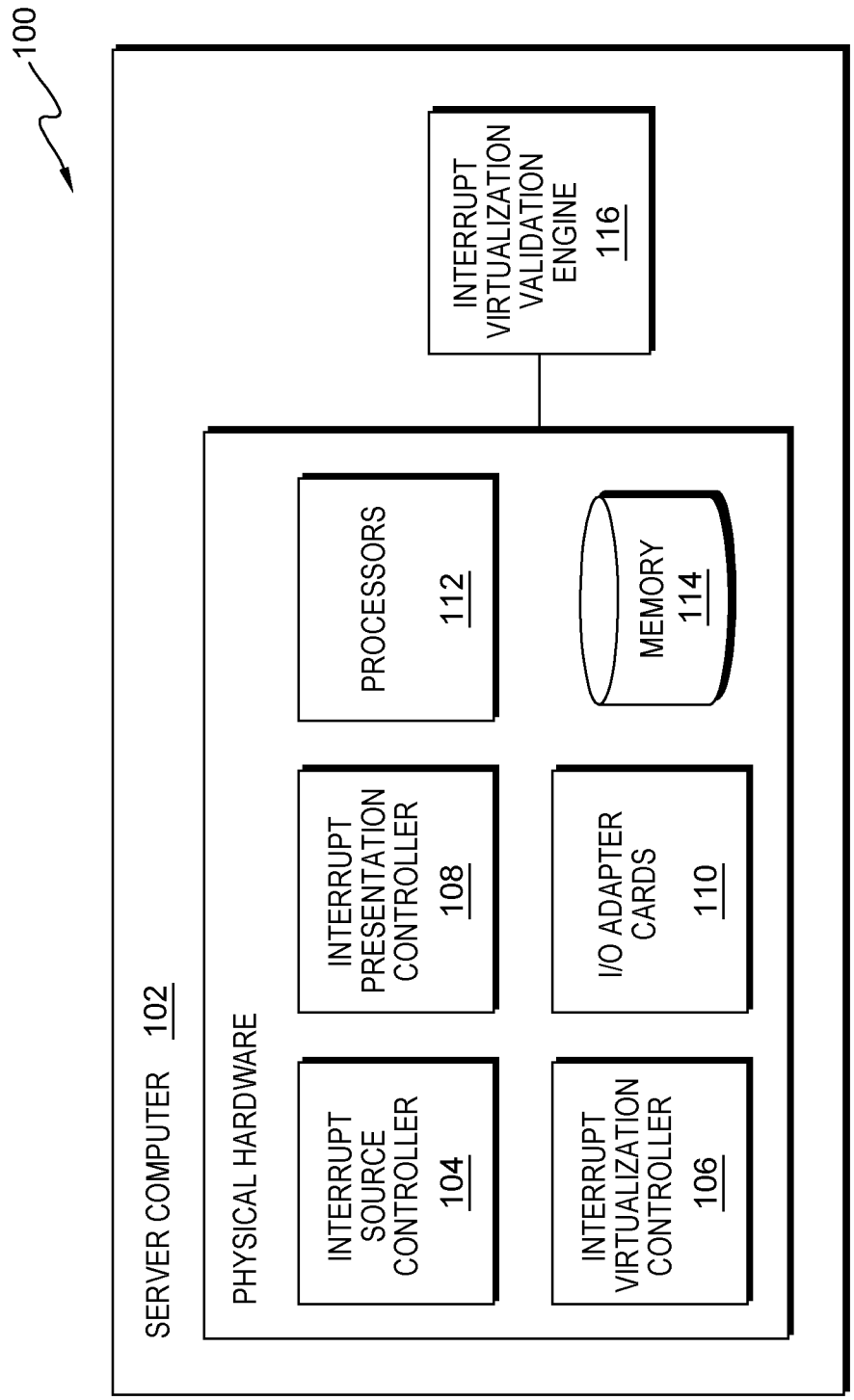
FIG. 1A is a functional block diagram illustrating a data processing environment, in accordance with an embodiment of the present invention.

Data processing systems in general, and microprocessors and microcontrollers in particular, are commonly provided with one or more channels for sensing an interrupt. An interrupt is an event that causes a processor to make a temporary transfer of control from its current program to another program that services the event. Interrupts may be provided upon the occurrence of various internal or external events, such as an error fault, and are the primary means by which input/output (I/O) devices obtain the services of a processor. Interrupts greatly increase the performance of a computer by allowing the I/O devices direct and rapid access to the processor and by freeing the processor from the task of continually testing the status of I/O devices.

In modern processors, there may be millions of external interrupts being generated and targeted toward various processing units. The interrupts may have the same identification, referred to herein as an interrupt source number, and may occur repeatedly, or there may be many different interrupt source numbers. If the processors cannot receive or accept the interrupt source numbers, then the interrupt source numbers are queued in one or more memory tables. System hardware constantly scans the memory tables when the processors are ready to process or accept the interrupt source numbers. If necessary, the queued interrupts may be escalated to a higher-level privilege of the processor in order to indicate a critical nature of the interrupt source number to the processors. A lost or undelivered interrupt is considered an error since a required action will not be processed.

Embodiments of the present invention recognize that efficiency of lost interrupt detection may be gained by implementing a correctness check to determine whether the hardware is working as designed by mapping a gang of interrupt source numbers to a corresponding group of virtual processors and updating a flag each time an interrupt source comes in for a virtual processor. By determining that only a subset of flags have been updated, embodiments of the present invention recognize not all of the interrupts in the gang have come in, and therefore an error has occurred. Implementation of embodiments of the invention may take a variety of forms, and exemplary implementation details are discussed subsequently with reference to the Figures.

FIG. 1 is a functional block diagram illustrating a data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Data processing environment 100 includes server computer 102. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a personal digital assistant (PDA), a smart phone, or any programmable electronic device capable of communicating with other computing devices (not shown) within data processing environment 100. In another embodiment, server computer 102 represents a computing system utilizing clustered computers and components (e.g., database server computers, application server computers, etc.) that act as a single pool of seamless resources when accessed within data processing environment 100. Server computer 102 includes physical hardware components interrupt source controller 104, interrupt virtualization controller 106, interrupt presentation controller 108, I/O adapter cards 110, processors 112, and memory 114. Server computer 102 also includes interrupt virtualization validation engine 116. Server computer 102 may include internal and external hardware components, as depicted and described in further detail with respect to FIG. 4.

Interrupt source controller 104 triggers interrupts with particular interrupt source numbers. Interrupt source controller 104 passes the allowed interrupt source numbers, which are allocated to interrupt source controller 104 at the time of system boot, to interrupt virtualization controller 106. In the depicted embodiment, interrupt source controller 104 is a standalone hardware device within server computer 102. In another embodiment, interrupt source controller 104 may be integrated into one or more of I/O adapter cards 110. In a further embodiment, interrupt source controller 104 may be integrated into one or more or processors 112. In one embodiment, interrupt source controller 104 can trigger the same interrupt source number multiple times. In the embodiment, the second time interrupt source controller 104 triggers an interrupt source number, interrupt source controller 104 records the instance as a separate interrupt. Interrupt source controller 104 tracks subsequent triggers of the same interrupt source number in the bit-marker for the second instance, not as a separate interrupt.

Interrupt virtualization controller 106 receives interrupt source numbers from interrupt source controller 104 and stores the interrupt source numbers and corresponding attributes in one or more tables in memory 114, where the tables act as a queue for the interrupts. Interrupt virtualization controller 106 is also responsible for escalating interrupt triggers for interrupt source numbers that are not scheduled on a virtual processor.

Figure 1B:
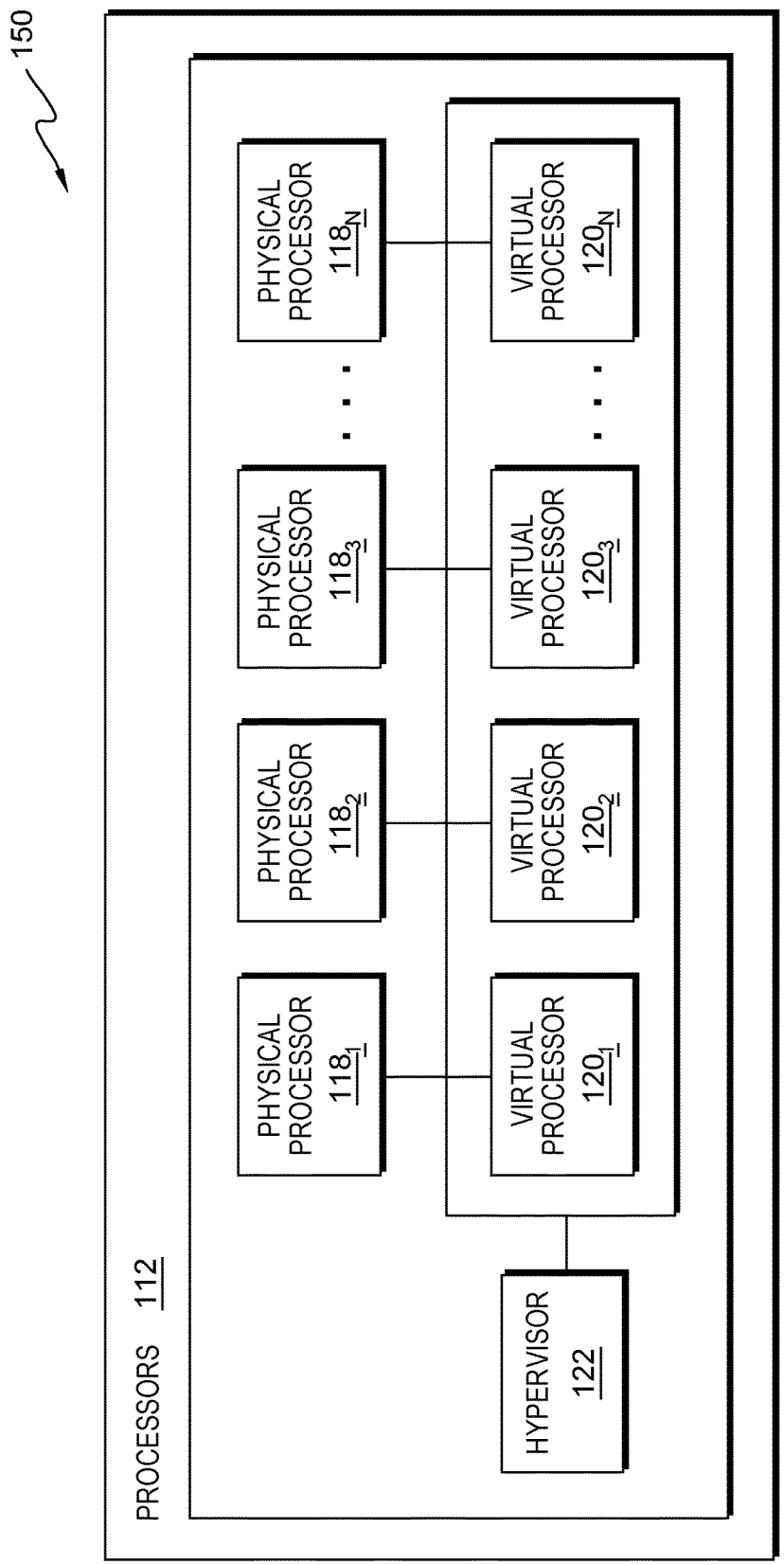
FIG. 1B is a functional block diagram illustrating a subset of the data processing environment shown in FIG. 1A.

Interrupt presentation controller 108 continually reads the tables of interrupt source numbers in the queue, as well as which one or more virtual processors integrated in processors 112, as will be discussed with respect to FIG. 1B, are scheduled to take the interrupt. When interrupt presentation controller 108 determines a match between a stored interrupt source number and the readiness of the processor unit of processors 112 that is scheduled to take the handoff of the interrupt, interrupt presentation controller 108 presents the interrupt to processors 112. Additionally, interrupt presentation controller 108 reports when interrupt virtualization controller 106 escalates an interrupt trigger.

I/O adapter cards 110 are one or more of a plurality of electronic circuits, expansion cards or plug-in modules that accept input and generate output in a particular format, as would be recognized by a person skilled in the art, where a conversion of the data format and electronic timing takes place between input/output streams and internal computer circuits. I/O adapter cards 110 may convert between the timing and protocol requirements of a memory bus and an I/O bus or network (not shown) of server computer 102.

Processors 112 are one or more microprocessors. A microprocessor is a computer processor which incorporates the functions of a computer's central processing unit (CPU) on a single integrated circuit (IC). The microprocessor is a multipurpose, clock driven, register based, digital-integrated circuit which accepts binary data as input, processes it according to instructions stored in its memory, and provides results as output. Microprocessors contain both combinational logic and sequential digital logic. Microprocessors operate on numbers and symbols represented in the binary numeral system. Processors 112 are depicted and described in further detail with respect to FIG. 1B.

Memory 114 is a repository for data used by server computer 102. In the depicted embodiment, memory 114 resides on server computer 102. In another embodiment, memory 114 may reside elsewhere within data processing environment 100 provided interrupt virtualization validation engine 116 has access to memory 114. Memory 114 can be implemented with any type of storage device capable of storing data and configuration files that can be accessed and utilized by interrupt virtualization validation engine 116, such as a database server, a hard disk drive, or a flash memory. Memory 114 stores interrupt source numbers sent by interrupt virtualization controller 106 prior to presentation by interrupt presentation controller 108. Memory 114 also stores an identification of corresponding processors of processors 112 to which interrupt presentation controller 108 presents the interrupts. In addition, memory 114 stores allocated flags corresponding to interrupt source numbers.

Interrupt virtualization validation engine 116 validates the correctness of interrupt triggers and delivery by mapping an interrupt source number to a contiguous group of virtual processors and updating a flag each time an interrupt source number comes in for a virtual processor, thus catching an undelivered or lost interrupt. As used herein, correctness refers to interrupt source controller 104, interrupt virtualization controller 106, and interrupt presentation controller 108 operating cohesively and working as designed with any sequence of interrupt source triggers following various possible paths and being delivered to a correct agent or group of agents. Interrupt virtualization validation engine 116 allocates a gang of flags, where each flag within the gang corresponds to one interrupt source number. Interrupt virtualization validation engine 116 allocates a gang of interrupt source numbers and instances of interrupt sources to the corresponding gang of flags. Interrupt virtualization validation engine 116 allocates virtual processors to process the allocated interrupt source numbers, resulting in a mapping of the gang of interrupt source numbers to the group of virtual processors. Interrupt virtualization validation engine 116 schedules the virtual processors. Interrupt virtualization validation engine 116 receives one or more interrupt triggers for the scheduled virtual processors. If the interrupt triggers were not escalated, then interrupt virtualization validation engine 116 updates the flags corresponding to the received triggers. If any of the interrupt triggers were escalated, then interrupt virtualization validation engine 116 schedules a higher priority virtual processor. After a time threshold has been exceeded, interrupt virtualization validation engine 116 determines whether all of the corresponding flags in the gang have been updated. If one or more flags have not been updated, then interrupt virtualization validation engine 116 determines the lost interrupt source. Interrupt virtualization validation engine 116 is depicted and described in further detail with respect to FIG. 2.

FIG. 1B is functional block diagram 150 illustrating a subset of data processing environment 100 shown in FIG. 1A.

Processors 112, as described with respect to FIG. 1A, include physical processors 118, virtual processors 120, and hypervisor 122.

Physical processors 118 are depicted as a plurality of physical microprocessors numbered from $118_1$ to $118_N$. Virtual processors 120 are depicted as a plurality of virtual microprocessors numbered from $120_1$ to $120_N$. As used herein, N represents a positive integer greater than 1, and accordingly the number of scenarios implemented in a given embodiment of the present invention is not limited to those depicted in FIG. 1A. In the depicted embodiment, physical processors 118 are mapped one to one to virtual processors 120. In another embodiment, physical processors 118 may be mapped to more than one virtual processors 120, as would be recognized by a person of skill in the art. As referred to herein, physical processors 118 may also represent one or more hardware threads.

Hypervisor 122 manages virtual processors 120. Hypervisors, also called virtual machine managers (VMMs), use a thin layer of code in software or firmware to achieve fine-grained, dynamic resource sharing. Because hypervisors provide the greatest level of flexibility in how virtual resources are defined and managed, they are generally the primary technology for system virtualization.

In the depicted embodiment, a single level of privilege for processors 112 is shown as virtual processors 120 corresponding to hypervisor 122. In another embodiment, additional levels of privilege may exist. For example, there may be a level of privilege associated with the operating system (OS), corresponding to one or more virtual processors. In another example, there may be a level of privilege associated with the user, corresponding to one or more virtual processors.

Figure 2:
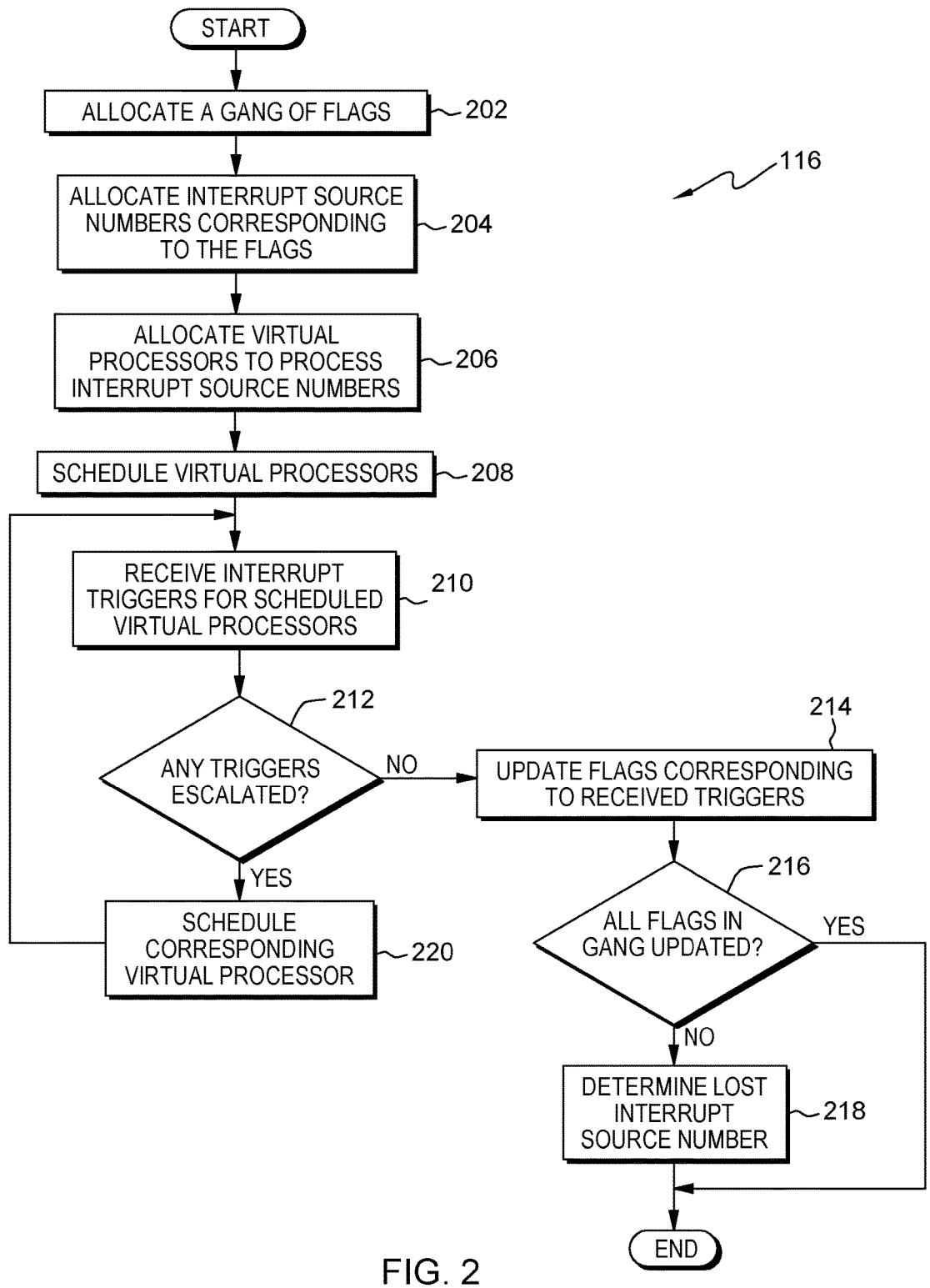
FIG. 2 is a flowchart depicting operational steps of an interrupt virtualization validation engine, on a server computer within the data processing environment of FIG. 1, for interrupt validation and configuration, in accordance with an embodiment of the present invention.

FIG. 2 is a flowchart depicting operational steps of interrupt virtualization validation engine 116, on server computer 102 within data processing environment 100 of FIG. 1, for interrupt validation and configuration, in accordance with an embodiment of the present invention.

Interrupt virtualization validation engine 116 allocates a gang of flags (step 202). As used herein, a gang of flags refers to a group of two or more flags, and a gang of interrupt source numbers refers a group of two or more interrupt source numbers, where the members of the group are associated with each other. In one embodiment, a flag represents a communication channel between an interrupt source and a virtual processor. Interrupt virtualization validation engine 116 allocates a gang of flags in memory 114, also referred to as a set of flags, such that each flag corresponds to an interrupt source number. For example, if there are eight interrupt source numbers in a gang, interrupt virtualization validation engine 116 allocates a set of eight flags, such that each interrupt source number is associated with a flag. In one embodiment, interrupt virtualization validation engine 116 allocates the gang of flags in an array.

Interrupt virtualization validation engine 116 allocates interrupt source numbers corresponding to the gang of flags (step 204). In one embodiment, interrupt virtualization validation engine 116 determines a number of interrupt source numbers available in the system, and chooses a number of the available interrupt source numbers to assign to a gang in order to create a one-to-one mapping of interrupt source numbers within the gang to the gang of flags allocated in step 202. In one embodiment, interrupt virtualization validation engine 116 chooses a number of interrupt source numbers that is less than or equal to the number of interrupt source numbers available in the system. In an embodiment, interrupt virtualization validation engine 116 chooses a number of interrupt source numbers that is a power of two, for example, eight, which is $2^3$. In one embodiment, interrupt virtualization validation engine 116 receives the number of interrupt sources available in the system from interrupt source controller 104.

Interrupt virtualization validation engine 116 allocates virtual processors to process the allocated interrupt source numbers (step 206). Interrupt virtualization validation engine 116 determines a number of virtual processors from virtual processors 120 to assign to a contiguous group. In one embodiment, the total number of virtual processors 120 available in the system is the total number of virtual processors associated with hypervisor 122. In another embodiment, the total number of virtual processors 120 available in the system is the total number of virtual processors associated with hypervisor 122, in addition to the total number of virtual processors corresponding to the operating system (OS) and to the user (not shown). In an embodiment, interrupt virtualization validation engine 116 chooses a number of virtual processors that is a power of two, for example, eight. In one embodiment, interrupt virtualization validation engine 116 maps the interrupt source numbers to the virtual processors one to one. For example, if there are eight interrupt source numbers and eight virtual processors, interrupt virtualization validation engine 116 maps the first interrupt source number to the first virtual processor, the second interrupt source number to the second virtual processor, etc. In another embodiment, interrupt virtualization validation engine 116 assigns a gang of interrupt source numbers to the group virtual processors within virtual processors 120. In a further embodiment, interrupt virtualization validation engine 116 can assign more than one gang of eight interrupt source numbers to a group of eight virtual processors. In yet another embodiment, interrupt virtualization validation engine 116 can assign interrupt source numbers to a combination of a single corresponding virtual processor and a group of virtual processors. Mapping of interrupt source numbers to virtual processors is depicted and described in further detail with respect to FIG. 3A and FIG. 3B. In one embodiment, interrupt virtualization validation engine 116 may perform step 206 prior to step 204 in order to allocate the interrupt source numbers such that the number of interrupt source numbers in a gang is a multiple of the number of available virtual processors.

Interrupt virtualization validation engine 116 schedules the virtual processors (step 208). An interrupt source number cannot come in until the corresponding virtual processor is scheduled in a hardware thread context area and the interrupt is enabled. Scheduling of virtual processors is independent of the trigger of interrupt source numbers. This allows various paths in the hardware for the traffic of interrupt sources through the hardware and in the tables in memory 114 maintained by the hardware. Before interrupt presentation controller 108 can present the interrupt to processors 112, interrupt virtualization controller 106 triggers each interrupt source number in the queue in memory 114 to one of virtual processors 120. The interrupt source number will not come in until the corresponding virtual processor is scheduled. In one embodiment, two or more of virtual processors 120, for example, virtual processor 120$i$ and virtual processor 1202, are scheduled on one hardware thread, one after another for some amount of time to see if the trigger has come in so that interrupt virtualization validation engine 116 can set a corresponding flag. In another embodiment, interrupt virtualization validation engine 116 can schedule the corresponding virtual processor on different hardware threads, if available at the same time, and enable an external interrupt. In one embodiment, a virtual processor may already be scheduled and running, so interrupt virtualization controller 106 does not queue the interrupt in memory 114, and interrupt presentation controller 108 can present the interrupt immediately.

Interrupt virtualization validation engine 116 receives interrupt triggers for scheduled virtual processors (step 210). In one embodiment, interrupt virtualization validation engine 116 receives the interrupt triggers on one or more hardware threads from interrupt presentation controller 108. A set of hardware threads, where the set includes a number of hardware threads that matches the number of virtual processors in the group, can pick up the gang of interrupt source numbers and the corresponding allocated group of virtual processors. For example, in a scenario where there are eight interrupt source numbers and eight virtual processors, the number of hardware threads in the set is eight. In one embodiment, any one hardware thread in the set can pick up all of the corresponding interrupt source numbers. In another embodiment, each hardware thread in the set can pick up one of the corresponding interrupt source numbers in the group. In another embodiment, interrupt virtualization validation engine 116 may receive the interrupt triggers from I/O adapter cards 110.

Interrupt virtualization validation engine 116 determines whether any of the received triggers are escalated (decision block 212). Interrupt virtualization validation engine 116 sets up escalation paths in memory 114 for use by interrupt virtualization controller 106. In one embodiment, interrupt virtualization validation engine 116 receives user input defining the escalation paths. In another embodiment, the priority of an interrupt request is pre-defined in the system. For example, an external interrupt originating from a mouse click may be pre-defined as having a higher priority than an external interrupt originating from a key press. Interrupt virtualization validation engine 116 may provide multiple levels of escalations to interrupt virtualization controller 106. In a case where an interrupt is a high priority but the corresponding virtual processor, i.e., the virtual processor to which the interrupt source number is mapped, is not scheduled, interrupt virtualization controller 106 can escalate the interrupt, based on importance, to a higher level or higher priority virtual processor as long as the interrupt is scheduled somewhere in the system. In one embodiment, the higher level virtual processor may be on a higher priority hypervisor or OS (not shown) than the virtual processor to which the interrupt source number is mapped. Interrupt presentation controller 108 communicates to interrupt virtualization validation engine 116 when interrupt virtualization controller 106 escalates an interrupt trigger, and indicates that the received trigger needs a higher priority.

If interrupt virtualization validation engine 116 determines none of the received triggers are escalated ("no" branch, decision block 212), then interrupt virtualization validation engine 116 updates flags corresponding to the received interrupt triggers (step 214). Each time an interrupt source number comes in for a virtual processor on a hardware thread, interrupt virtualization validation engine 116 updates the corresponding flag. All hardware threads in the gang wait for all the flags corresponding to the number of interrupt source numbers in the gang to be updated prior to presentation of the interrupts. In an embodiment where the allocated interrupt source numbers in the gang is a multiple of the number of virtual processors, then interrupt virtualization validation engine 116 updates the flag by the multiple.

Interrupt virtualization validation engine 116 determines whether all flags in the gang have been updated (decision block 216). In one embodiment, interrupt virtualization validation engine 116 waits for a pre-defined time duration threshold to be exceeded before determining whether any of the flags corresponding to the gang of interrupt source numbers have been updated. For example, interrupt virtualization validation engine 116 may wait for one second after scheduling a virtual processor for receiving an interrupt trigger before calling an error. In an embodiment, the duration of wait time may be influenced by the size of the gang. In another embodiment, the duration of wait time may be influenced by the amount of traffic in the chip, i.e., one or more of processors 112. If interrupt virtualization validation engine 116 determines that all flags in the gang have been updated ("yes" branch, decision block 216), then interrupt virtualization validation engine 116 ceases execution.

If interrupt virtualization validation engine 116 determines that all flags in the gang have not been updated ("no" branch, decision block 216), then interrupt virtualization validation engine 116 determines a lost interrupt source number (step 218). A flag that is not updated within the pre-defined threshold of time indicates an interrupt source number was lost or not delivered, which is considered an error. If an interrupt source number is lost, then interrupt presentation controller 108 does not present the gang of interrupt source numbers to the corresponding virtual processors. In one embodiment, interrupt virtualization validation engine 116 presents the error to a user for debug of hardware logic in interrupt source controller 104 as an error message through a user interface.

If interrupt virtualization validation engine 116 determines any of the received triggers are escalated ("yes" branch, decision block 212), then interrupt virtualization validation engine 116 schedules a corresponding virtual processor (step 220). Upon recognizing that the interrupt trigger is escalated to a higher priority virtual processor, interrupt virtualization validation engine 116 schedules the corresponding virtual processor i.e., the virtual processor to which the interrupt source number is mapped. Subsequent to scheduling the corresponding virtual processor to process the escalated interrupt trigger, interrupt virtualization validation engine 116 returns to step 210 to receive the trigger for the newly scheduled virtual processor.

Figure 3A:
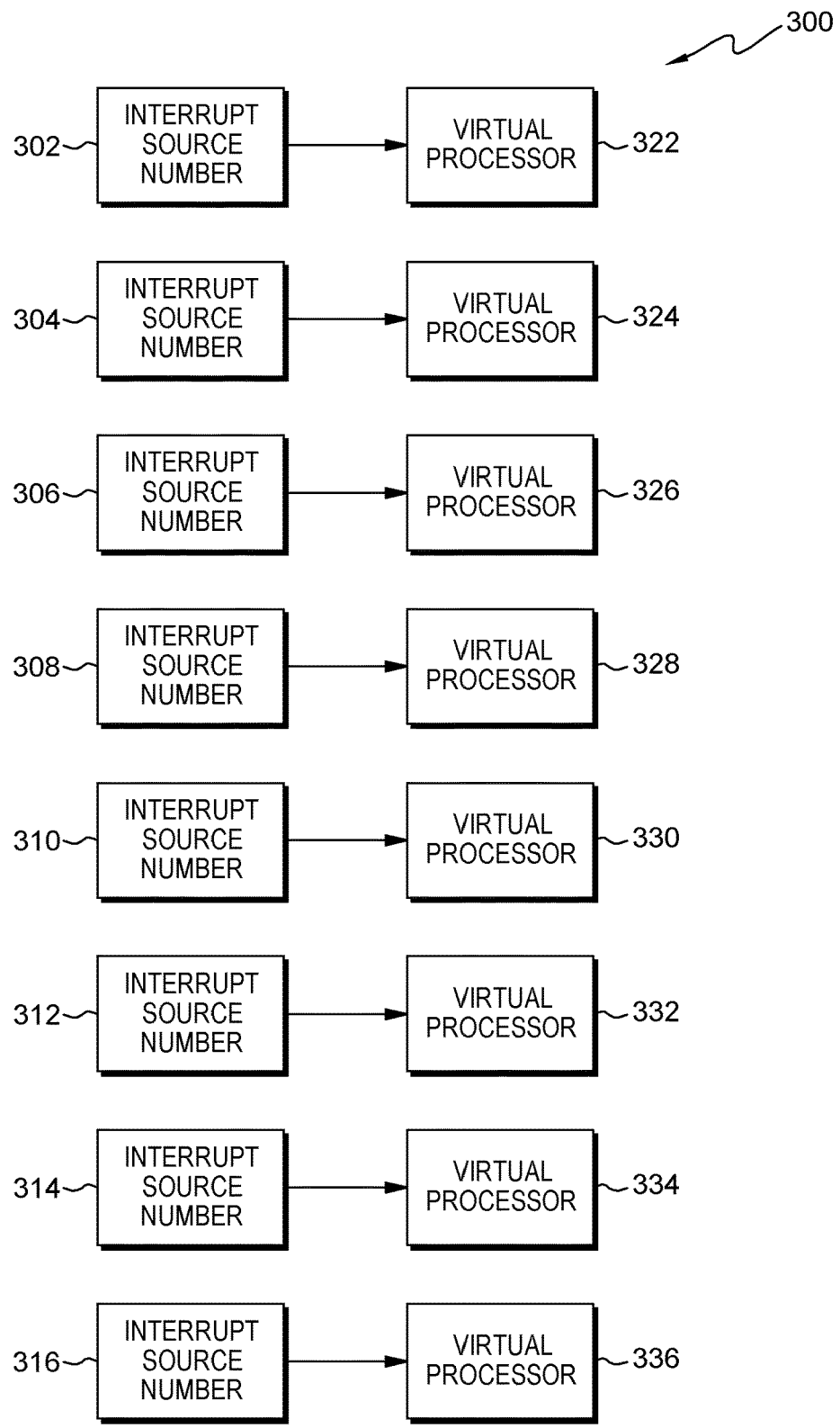
FIG. 3A illustrates an example of the use of the interrupt virtualization validation engine for a direct interrupt, on the server computer within the data processing environment of FIG. 1, in accordance with an embodiment of the present invention.

FIG. 3A illustrates an example of the use of interrupt virtualization validation engine 116 for a direct interrupt, on server computer 102 within data processing environment 100 of FIG. 1, in accordance with an embodiment of the present invention.

FIG. 3A depicts a gang of eight interrupt source numbers, including interrupt source number 302 through interrupt source number 316. As depicted in FIG. 3A, virtual processor 322 through virtual processor 336 are individual processors and do not form a group, therefore each of the eight interrupt source numbers is mapped one-to-one with one virtual processor, as discussed with respect to step 206 of FIG. 2. For example, virtual processor 322 is allocated, or mapped, to interrupt source number 302. The mapping is indicated by the arrows spanning from each interrupt source to a corresponding virtual processor. In one embodiment, if, for example, virtual processor 322 is not scheduled to receive interrupt source number 302, then interrupt virtualization validation engine 116 may escalate interrupt source number 302 to another virtual processor, such as virtual processor 330.

Figure 3B:
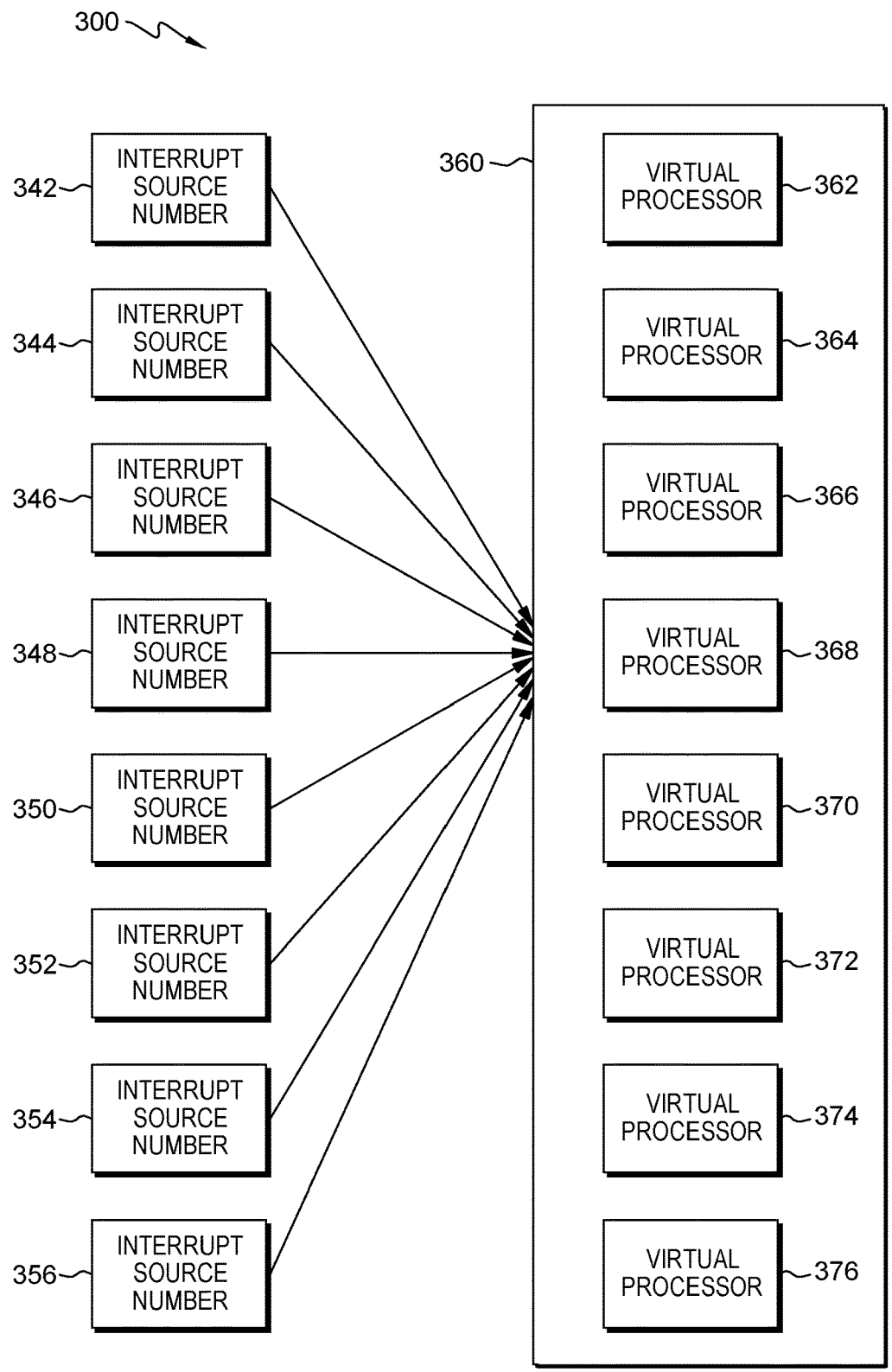
FIG. 3B illustrates an example of the use of the interrupt virtualization validation engine for a group interrupt, on the server computer within the data processing environment of FIG. 1, in accordance with an embodiment of the present invention.

FIG. 3B illustrates an example of the use of interrupt virtualization validation engine 116 for a group interrupt, on server computer 102 within data processing environment 100 of FIG. 1, in accordance with an embodiment of the present invention.

FIG. 3B depicts a gang of eight interrupt source numbers, including interrupt source number 342 through interrupt source number 356. All of the eight interrupt source numbers are mapped to virtual processor group 360, which includes virtual processor 362 through virtual processor 376, as discussed with respect to step 206 of FIG. 2. The mapping is indicated by the arrows spanning from each interrupt source to virtual processor group 360. In the depicted embodiment, all interrupt source numbers in the gang are serviced by virtual processor group 360, thus any one of the virtual processors within virtual processor group 360 is capable and eligible to process any of the interrupt source numbers mapped to the group. In another embodiment, any one of the virtual processors depicted within virtual processor group 360 may service all the interrupt source numbers in the gang. Interrupt presentation controller 108 confirms that only one virtual processor in the group receives the trigger for a particular interrupt source number.

Figure 4:
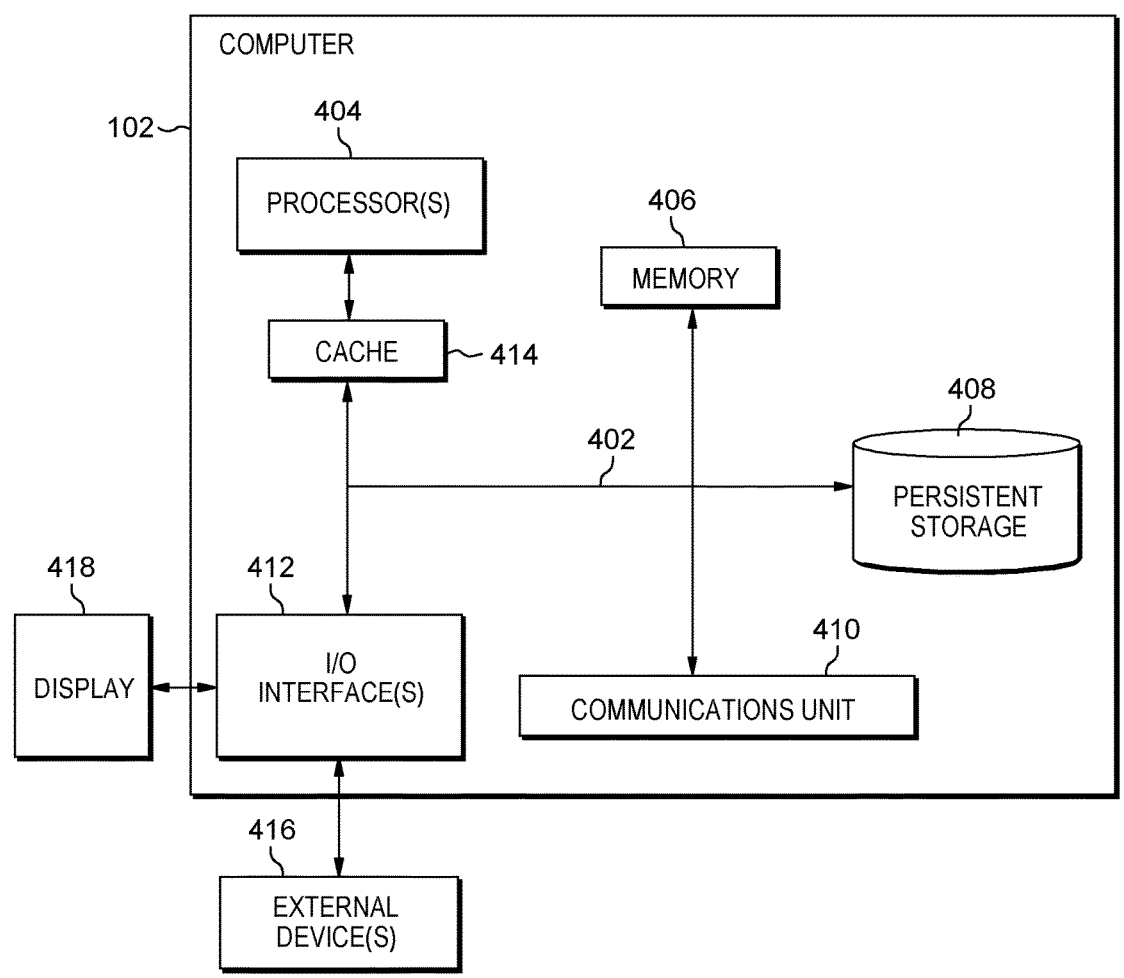
FIG. 4 depicts a block diagram of components of the server computer executing the interrupt virtualization validation engine within the data processing environment of FIG. 1A, in accordance with an embodiment of the present invention.

FIG. 4 depicts a block diagram of components of server computer 102 within data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 102 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention can be stored in persistent storage 408 for execution and/or access by one or more of the respective processor(s) 404 of server computer 102 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 of server computer 102 through communications unit 410.

I/O interface(s) 412 allows for input and output of data with other devices that may be connected to server computer 102. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for validation of correctness of interrupt triggers and delivery, the method comprising:
   allocating, by one or more computer processors, a set of flags, wherein the set of flags is a group of two or more flags associated with each other;
   allocating, by the one or more computer processors, one or more interrupt source numbers, wherein each interrupt source number of the one or more interrupt source numbers is mapped to a specific flag of the set of flags;
   allocating, by the one or more computer processors, one or more virtual processors to process the one or more interrupt source numbers;
   scheduling, by the one or more computer processors, the one or more virtual processors;
   receiving, by the one or more computer processors, one or more interrupt triggers corresponding to the one or more interrupt source numbers;
   updating, by the one or more computer processors, one or more flags of the set of flags corresponding to the one or more received interrupt triggers;
   determining, by the one or more computer processors, whether all flags in the set of flags are updated; and
   responsive to determining at least one of the flags in the set of flags is not updated, determining, by the one or more computer processors, at least one lost interrupt source number corresponding to the at least one flag that was not updated.

2. The method of claim 1, further comprising:
   responsive to receiving one or more interrupt triggers corresponding to the one or more interrupt source numbers, determining, by the one or more computer processors, whether at least one of the received interrupt triggers is an escalated trigger; and
   responsive to determining at least one of the received interrupt triggers is an escalated trigger, scheduling, by the one or more computer processors, a corresponding virtual processor to process the escalated trigger.

3. The method of claim 1, wherein allocating gang the set of flags comprises allocating, by the one or more computer processors, the set of flags in an array.

4. The method of claim 1, wherein allocating one or more virtual processors to process the one or more interrupt source numbers comprises allocating, by the one or more computer processors, each virtual processor of the one or more virtual processors to process a single corresponding interrupt source number of the one or more interrupt source numbers.

5. The method of claim 1, wherein allocating one or more virtual processors to process the one or more interrupt source numbers comprises allocating, by the one or more computer processors, a group of virtual processors to a gang of interrupt source numbers, wherein a gang of interrupt source numbers is a plurality of interrupt source numbers associated with each other.

6. The method of claim 1, further comprising, prior to determining whether all flags in the set of flags are updated, waiting, by the one or more computer processors, for a pre-defined time duration.

7. The method of claim 1, further comprising, responsive to determining at least one lost interrupt source number, presenting, by the one or more computer processors, an error message through a user interface to a user.

8. A computer program product for validation of correctness of interrupt triggers and delivery, the computer program product comprising:
   one or more computer readable storage devices and program instructions stored on the one or more computer readable storage devices, the stored program instructions comprising:
   program instructions to allocate a set of flags, wherein the set of flags is a group of two or more flags associated with each other;
   program instructions to allocate one or more interrupt source numbers, wherein each interrupt source number of the one or more interrupt source numbers is mapped to a specific flag of the set of flags;
   program instructions to allocate one or more virtual processors to process the one or more interrupt source numbers;
   program instructions to schedule the one or more virtual processors;
   program instructions to receive one or more interrupt triggers corresponding to the one or more interrupt source numbers;
   program instructions to update one or more flags of the set of flags corresponding to the one or more received interrupt triggers;
   program instructions to determine whether all flags in the set of flags are updated; and
   responsive to determining at least one of the flags in the set of flags is not updated, program instructions to determine at least one lost interrupt source number corresponding to the at least one flag that was not updated.

9. The computer program product of claim 8, the stored program instructions further comprising:
   responsive to receiving one or more interrupt triggers corresponding to the one or more interrupt source numbers, program instructions to determine whether at least one of the received interrupt triggers is an escalated trigger; and
   responsive to determining at least one of the received interrupt triggers is an escalated trigger, program instructions to schedule a corresponding virtual processor to process the escalated trigger.

10. The computer program product of claim 8, wherein the program instructions to allocate the set of flags comprise program instructions to allocate the set of flags in an array.

11. The computer program product of claim 8, wherein the program instructions to allocate one or more virtual processors to process the one or more interrupt source numbers comprise program instructions to allocate each virtual processor of the one or more virtual processors to process a single corresponding interrupt source number of the one or more interrupt source numbers.

12. The computer program product of claim 8, wherein the program instructions to allocate one or more virtual processors to process the one or more interrupt source numbers comprise program instructions to allocate a group of virtual processors to a gang of interrupt source numbers, wherein a gang of interrupt source numbers is a plurality of interrupt source numbers associated with each other.

13. The computer program product of claim 8, the stored program instructions further comprising, prior to determining whether all flags in the set of flags are updated, program instructions to wait for a pre-defined time duration.

14. The computer program product of claim 8, the stored program instructions further comprising, responsive to determining at least one lost interrupt source number, program instructions to present an error message through a user interface to a user.

15. A computer system for validation of correctness of interrupt triggers and delivery, the computer system comprising:
- one or more computer processors;
- one or more computer readable storage devices;
- program instructions stored on the one or more computer readable storage devices for execution by at least one of the one or more computer processors, the stored program instructions comprising:
- program instructions to allocate a set of flags, wherein the set of flags is a group of two or more flags associated with each other;
- program instructions to allocate one or more interrupt source numbers, wherein each interrupt source number of the one or more interrupt source numbers is mapped to a specific flag of the set of flags;
- program instructions to allocate one or more virtual processors to process the one or more interrupt source numbers;
- program instructions to schedule the one or more virtual processors;
- program instructions to receive one or more interrupt triggers corresponding to the one or more interrupt source numbers;
- program instructions to update one or more flags of the set of flags corresponding to the one or more received interrupt triggers;
- program instructions to determine whether all flags in the set of flags are updated; and
- responsive to determining at least one of the flags in the set of flags is not updated, program instructions to determine at least one lost interrupt source number corresponding to the at least one flag that was not updated.

16. The computer system of claim 15, the stored program instructions further comprising:
- responsive to receiving one or more interrupt triggers corresponding to the one or more interrupt source numbers, program instructions to determine whether at least one of the received interrupt triggers is an escalated trigger; and
- responsive to determining at least one of the received interrupt triggers is an escalated trigger, program instructions to schedule a corresponding virtual processor to process the escalated trigger.

17. The computer system of claim 15, wherein the program instructions to allocate the set of flags comprise program instructions to allocate the set of flags in an array.

18. The computer system of claim 15, wherein the program instructions to allocate one or more virtual processors to process the one or more interrupt source numbers comprise program instructions to allocate each virtual processor of the one or more virtual processors to process a single corresponding interrupt source number of the one or more interrupt source numbers.

19. The computer system of claim 15, wherein the program instructions to allocate one or more virtual processors to process the one or more interrupt source numbers comprise program instructions to allocate a group of virtual processors to a gang of interrupt source numbers, wherein a gang of interrupt source numbers is a plurality of interrupt source numbers associated with each other.

20. The computer system of claim 15, the stored program instructions further comprising, prior to determining whether all flags in the set of flags are updated, program instructions to wait for a pre-defined time duration.

* * * * *